Oct. 9, 1934.  F. I. ROACH  1,976,142
AUTOMATIC CORN POPPING MACHINE
Filed Oct. 10, 1932  2 Sheets-Sheet 1
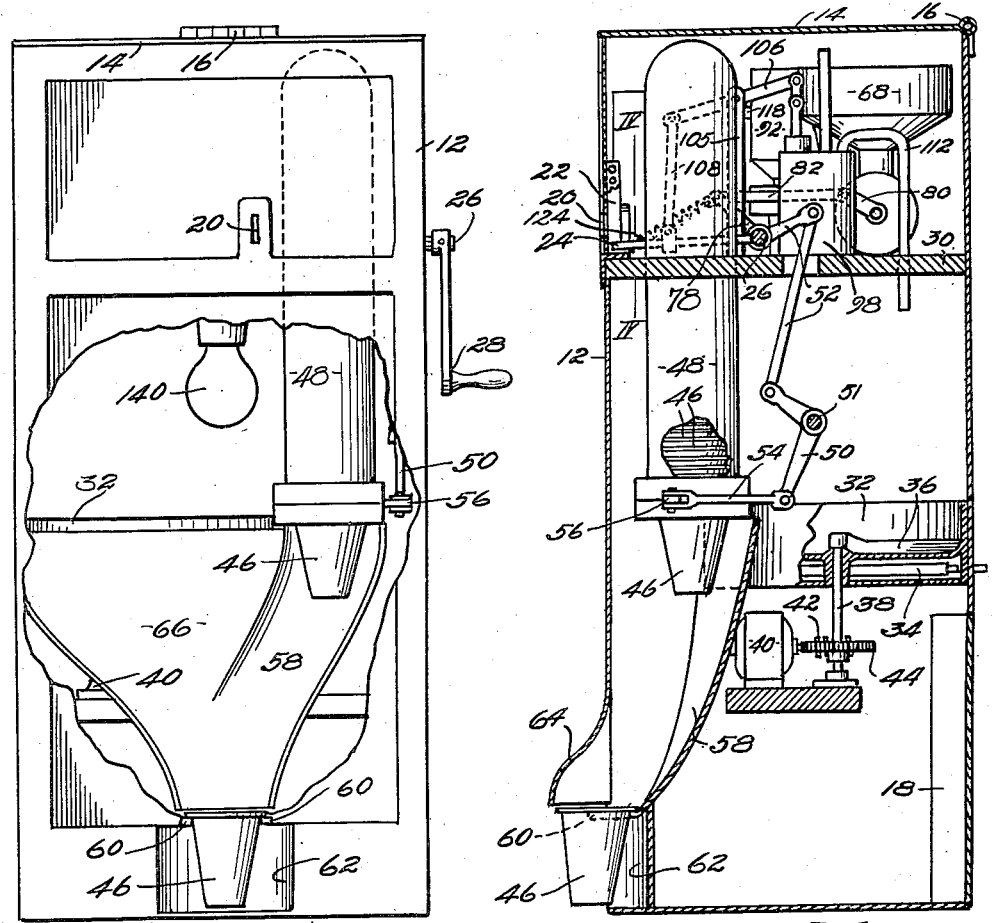
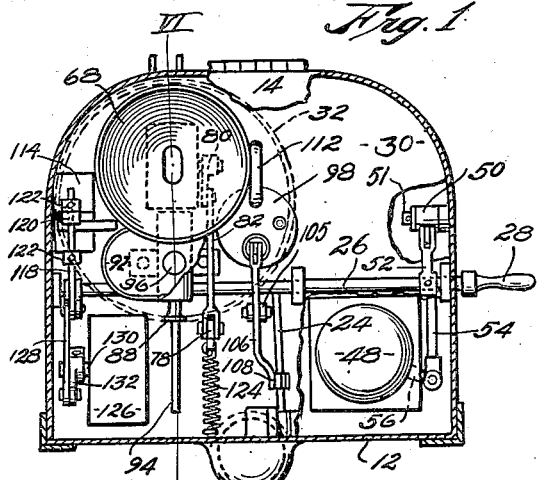
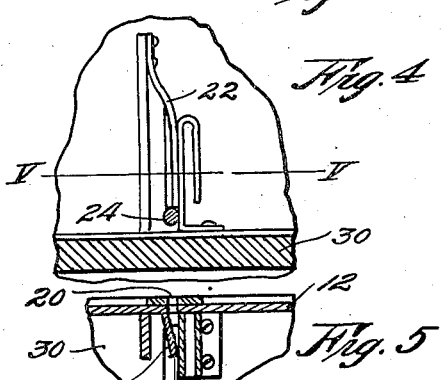
INVENTOR,
Floyd I. Roach.
BY Hovey & Hamilton,
ATTORNEYS.

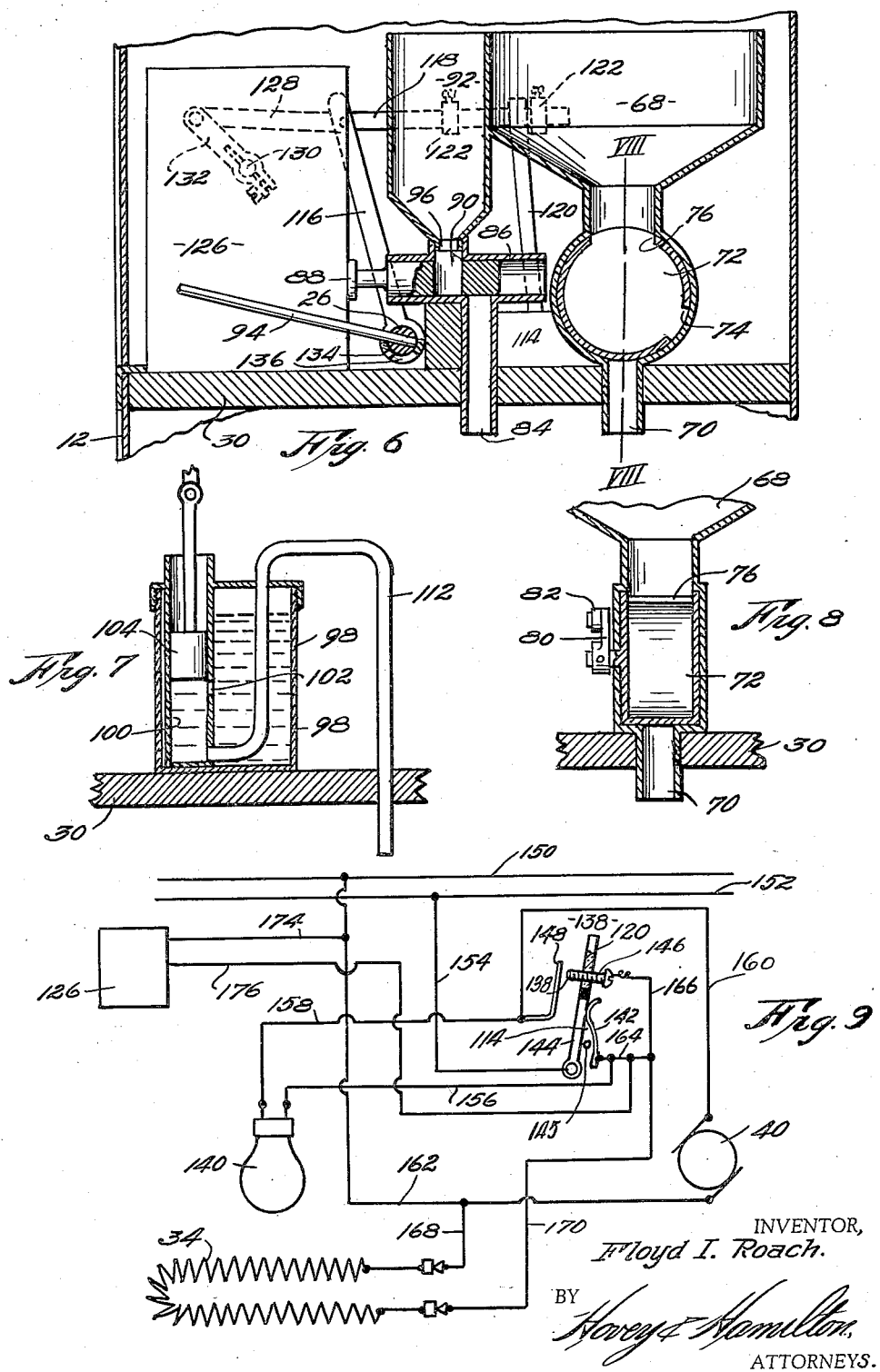

Patented Oct. 9, 1934

1,976,142

UNITED STATES PATENT OFFICE 1,976,142

AUTOMATIC CORN POPPING MACHINE

Floyd I. Roach, Kansas City, Mo.

Application October 10, 1932, Serial No. 636,987

9 Claims. (Cl. 53—4)

This invention relates to vending and cooking machines and has particular reference to such a structure, wherein is incorporated means for popping and delivering popped corn, the primary object of the invention being the contemplation of novel means for delivering the necessary ingredients to a heated pan wherein the corn is popped.

Another object of the instant invention is the contemplation of a corn popping machine of the aforementioned character having unique apparatus for the delivery of a receptacle, to hold the popped corn, as the ingredients making up the batch is fed to a heated pan.

A still further object of the invention is the provision of an electrically driven agitator within a heated pan, said agitator being combined with an electric motor and the motor circuit, said circuit having novel features of construction to permit driving said agitator at different rates of speed at different predetermined times during the popping of the corn for the purpose of precluding sticking or burning and also to expel the popped corn from the heated pan after the popping operation has been completed.

One of the salient aims of the invention is to provide, in a machine of this character, a unique combination of parts, some of which are manually operated, said manual operation being instrumental in setting up electrically driven apparatus which completes the operations of popping the corn and delivering the same to a point where it is available for use.

With these broad general objects in view, the invention will be more definitely described in the following specification, referring to the accompanying drawings, wherein:

Figure 1 is a front elevation of a corn popping machine embodying this invention.

Fig. 2 is a horizontal, sectional view through the same, parts being broken away for clearness.

Fig. 3 is a vertical section through the machine.

Fig. 4 is a fragmentary, detailed, sectional view illustrating the coin-releasing mechanism, and taken on line IV—IV of Fig. 3.

Fig. 5 is a similar view taken on line V—V of Fig. 4.

Fig. 6 is an enlarged, detailed, sectional view taken along line VI—VI of Fig. 2.

Fig. 7 is a fragmentary, detailed, sectional view through the oil reservoir and associated parts.

Fig. 8 is a fragmentary, detailed, sectional view of the corn feeding mechanism, taken on line VIII—VIII of Fig. 6, and, Fig. 9 is a diagrammatical view illustrating the electrical circuit used in the corn popping machine.

In constructing a machine of the character contemplated, a case 12 should be provided to house the mechanism and to preclude access thereto by unauthorized persons. A cover 14 may be hingedly attached as at 16 to permit placing the necessary ingredients into the various storage containers, and a door 18 may be provided to permit access to the hereinafter described driving members.

It is preferred to use a coin-releasing feature in operating this machine, and to carry out this expedient, coin slot 20 permits the user to introduce a coin to a point where it depresses resilient leaf 22 so that locking arm 24 is released to permit operating shaft 26 to be turned by operating crank 28, disposed exteriorly of case 12. As shown in Fig. 3, arm 24 extends laterally from shaft 26 to which it is rigidly affixed and its position between the end of member 22 and partition 30 precludes movement until a coin is introduced to effect release.

In the compartment formed below partition 30 there is disposed a pan 32, beneath which is positioned a heating element 34 for the purpose of imparting sufficient heat to pop the corn. An agitator 36 is rotatably mounted upon shaft 38 for movement within pan 32 and shaft 38 is driven by motor 40 through the medium of worm gear 42 and gear 44 in mesh therewith.

When a coin is introduced through slot 20, it is desirable to simultaneously feed into pan 32 a quantity of unpopped corn, a supply of popping oil and an amount of salt. When these ingredients are introduced into pan 32, it is also contemplated by this invention to place a receptacle 46 so that when the corn is popped and expelled from pan 32, the same will be caught and made ready for delivery to the operator of the machine.

Shaft 26, therefore, actuates several different groups of mechanisms. In the first instance, a receptacle 46 is fed from a magazine 48 by the employment of bell crank lever 50 mounted on stub shaft 51, links 52 and arms 54 and 56. When one receptacle 46 is fed from magazine 48 it falls directly into chute 58 and drops, by gravity, to a holder 60 partially within cavity 62 formed by case 12. A canopy 64 overlies receptacle 46 as it is retained by holder 60 so that the popped corn will not jump from the receptacle. A chute 66 extends from pan 32 to holder 60 for the purpose of conveying popped corn from the former to a receptacle 46 held by the latter. Chutes 58 and 66 converge to a common point, as shown in Fig. 1.

Shaft 26 also operates the mechanism for feeding unpopped corn to pan 32. The corn is carried in a storage hopper 68 and is fed to pan 32 through conduit 70. Interposed in this conduit is means for measuring a predetermined amount of the corn which should constitute just enough to fill a receptacle 46 as the corn is popped.

This means for measuring the corn is in the form of an oscillating holder 72 having an exit opening 74 and an intake opening 76. When the holder is in the position shown in Fig. 6, corn is entering the same from hopper 68. Upon movement of the holder to a point where opening 74 is in register with conduit 70, opening 76 will move around to be closed and the corn within holder 72 will pass by gravity to pan 32. This movement is imparted to holder 72 by connection to shaft 26. This connection is in the form of an arm 78, carried by shaft 26, and arm 80, carried by holder 72 and a connecting link 82. As corn is being fed to pan 32, a quantity of salt is likewise introduced thereto through pipe 84 which projects downwardly from cylinder 86, wherein is reciprocably disposed a piston 88. This piston has a cavity 90 formed therein that is in communication with storage container 92 when the machine is not being operated. As shaft 26 is turned, the laterally extending arm 94 engages the projected end of piston 88 to move cavity 90 into register with pipe 84. Thus salt is dropped into pan 32 and the opening 96 in the bottom of container 92 and through which salt is introduced to cavity 90, is closed by virtue of the offset relation between pipe 84 and opening 96.

The third ingredient that is fed into pan 32 as shaft 26 is turned is in the form of an oil known as popping oil. Reservoir 98 has a cylinder 100 therein, through which is formed port 102. Piston 104 is reciprocated vertically by shaft 26 through the medium of rocker arm 106 fulcrumed on member 105 and link 108 which is pivotally connected to laterally extending arm 24. Tube 112 extends from the bottom of member 100 and when piston 104 is moved downwardly, it closes port 102 and forces a charge of oil through tube 112 and down into pan 32.

From the foregoing it will be seen that the manual act of moving operating crank 28 will not only introduce a receptacle 46 to holder 60, but will likewise feed a predetermined amount of materials to pan 32 from each of the storage compartments 68, 92 and 98. As soon as these ingredients are introduced into pan 32, it is desirable to set agitator 36 into motion, and to do this a snap switch 114 is actuated by shaft 26 by lever 116 and bar 118 which carries arm 120. Because of the nature of this switch, the free end of arm 120 is mounted upon bar 118 between collars 122. When these aforementioned parts are carried to the set position, the circuit is closed and not only is element 34 made to heat pan 32, but agitator 36 is actuated by the starting of motor 40. The popping action takes but a short time, at the end of which time it is necessary to automatically cut off the supply of electrical energy and, while spring 124 has previously returned all the manually controlled parts to their points of beginning, it is necessary to allow switch 114 to remain closed during the popping action.

A synchronous motor 126 has connection with bar 118 through the medium of bar 128 and this motor 126 is set into action as soon as switch 114 is closed. Its shaft 130, however, is connected to bar 128 by arm 132 and as motor 126 is turned, it slowly moves switch arm 120 to the position where switch 114 will be opened. The motor 126 moves the arm 132 through an acute angle in but one direction to open the switch 114 after it has been closed manually. It is therefore apparent that arm 132 is moved in one direction manually and in the opposite direction by means of the synchronous motor 126. The timing of the movement of the arm 132 to facilitate proper popping of the corn is easily controlled by the speed of the motor shaft 150. A hub of lever 116 is slotted as shown in Fig. 6 to permit such action without affecting shaft 26, yet when the end of the path of travel of lever 116 is reached where it has opened switch 114, pin 134 will be at the end of slot 136 so that shaft 26 may again impart movement to lever 116.

Just prior to opening switch 114 it is desirable to increase the speed of motor 40 and thereby move agitator 36 at a speed where all popped corn within pan 32 will be expelled therefrom. To do this, there is provided a secondary switch 138 which is closed by arm 120 for the purpose of cutting out a resistance element 140 which has been utilizing a portion of the available electrical energy passing to motor 40. Just before points 142 and 144 of switch 114 are parted, points 146 and 148 of secondary switch 138 are brought together to cut out resistance lamp 140 and thus to speed motor 40. Closed relation between points 142 and 144 during the closing or bringing together of points 146 and 148 is possible because point 142 is in the form of a spring or resilient finger that follows pivotally mounted arm 144 as it carries point 146 toward point 148. A stop 145 may be used to limit movement of both members 142 and 144. As soon as points 142 and 144 are parted, the circuit of motor 40 is opened and the machine has been cleared of all popped corn.

Fig. 9 illustrates, in a diagrammatical manner, the circuit which may be used in this popping machine. When switch 114 is manually moved to the closed position, motor 40 will receive electrical energy from supply line 152 through wire 154, switch 114, conduit 156, resistance lamp 140, wire 158 and wire 160. This circuit to the motor is completed back to line 150 by wire 162. As soon as the resistance is cut out by closing points 146 and 148, all of the energy of the supply lines passes to motor 40 through a circuit which, for convenience, may start at supply line 152 and pass through wire 154, closed switch points 144 and 142, wire 164, wire 166, switch points 146 and 148 and wire 160 to motor 40. From motor 40 the circuit is completed back to main line 150 by wire 162. Current reaches heating element 34 when switch 114 is closed through the following circuit: Line 150 to wire 162, wire 168 to element 34. From element 34 the circuit is completed through wire 170, wire 164, closed points 142 and 144, wire 154 to line 152.

The synchronous motor 126 receives energy also when switch 114 is closed through the following conductors: From line 150 through wire 174 to motor 126, thence through wire 176 to wire 164, closed switch points 142 and 144 and thence back to line 152 through wire 154.

While this invention has been disclosed by illustrating a single embodiment of the same, it is understood that such changes and modifications may be enjoyed as fairly fall within the spirit of the invention and scope of the appended claims.

Having thus described the invention, what is claimed as new and desired to be secured by Letters Patent is:

1. A corn popping machine of the character described comprising, in combination with a heated pan wherein to pop the corn, a storage hopper for the corn; a storage container for salt; a storage reservoir for oil; a conduit for each of said storage members respectively, to carry materials to said pan from their respective associated storage member; means interposed in each conduit for measuring a charge of material; a storage magazine for a plurality of receptacles; and manually actuated operating apparatus common to all of said measuring means whereby to simultaneously feed a measured amount of material from each storage member into said pan, said operating means having releasing mechanism for ejecting a receptacle from the said storage magazine therefor and permitting it to drop to a corn-receiving position as the said material is measured and fed to the said pan.

2. A corn popping machine of the character described comprising, in combination with a heated pan wherein to pop the corn, a storage hopper for the corn; a storage container for salt; a storage reservoir for oil; a conduit for each of said storage members respectively, to carry materials to said pan from their respective associated storage member; means interposed in each conduit for measuring a charge of material; a storage magazine for a plurality of receptacles; manually actuated operating apparatus common to all of said measuring means for simultaneously feeding a measured amount of material from each storage member into said pan; means for releasing a receptacle from the said storage magazine as the said material is measured and fed to the said pan; a holder for the receptacle; and means for ejecting the popped corn from said pan and into the said receptacle at a predetermined time.

3. In a corn popping machine of the character described, the combination with a heated pan wherein to pop the corn, of a motor; a motor-driven agitator within the pan; conductors to supply current to said motor; a switch forming a part of said conductors; a device to move said switch from the closed to the open position; and structure to increase the speed of said motor and agitator for a predetermined time immediately prior to the opening of said switch by the switch moving device.

4. In a corn popping machine of the character described, the combination with a heated pan wherein to pop the corn, of a motor; a motor-driven agitator within the pan; conductors to supply current to said motor; a switch forming a part of said conductors; an electrical flow resistance member associated with said current conductors; a device to move said switch from the closed to the open position; and structure operable for a predetermined time immediately prior to the opening of said switch for eliminating said resistance member from association with said conductors whereby to increase the speed of said motor and agitator.

5. In a corn popping machine of the character described, the combination with a heated pan wherein to pop the corn, of a motor; a motor-driven agitator within said pan; and a circuit to supply current to said motor for a predetermined length of time and in a greater amount at the end of said time, including a main switch to open and close said cicuit, a synchronous motor to move the switch from the closed to the open position, a resistance member associated with said circuit, and an auxiliary switch closable by said synchronous motor as it is drawing the said main switch toward its open position.

6. In a corn popping machine of the character described, the combination with a heated pan wherein to pop the corn, of a motor; a magazine to hold a plurality of receptacles; an agitator within said pan; a motor to drive the agitator; a switch to make and break the motor circuit; and manually operable means to simultaneously close said switch and eject a receptacle from said magazine.

7. In a corn popping machine of the character described, the combination with a heated pan wherein to pop the corn, of a magazine to hold a plurality of receptacles; an agitator within said pan; a motor to drive the agitator; a receptacle holder; a chute to direct a receptacle from the magazine to said holder; and a chute connecting the said pan and receptacle holder, said agitator being movable by said motor to expel the popped corn from the said pan into the second-mentioned chute.

8. In a corn popping machine of the character described, a heated pan wherein to pop the corn; an agitator rotatably mounted within the pan; a receptacle magazine; a pair of converging chutes; a receptacle holder at the point of convergence of said chutes; manually operable releasing mechanism for ejecting one of the said receptacles into one of the chutes; and means to drive the said agitator at a speed sufficient to expel the popped corn from the pan, said expelled popped corn traveling to the receptacle in said holder along the other of said chutes.

9. In a corn popping machine of the character described, a heated pan wherein to pop the corn; a rotatable agitator within the pan; and electrical means for driving said agitator at different rates of speed at different predetermined times during the popping of the corn.

FLOYD I. ROACH.